(12) United States Patent
Mandella

(10) Patent No.: US 6,456,439 B1
(45) Date of Patent: *Sep. 24, 2002

(54) COLLIMATOR EMPLOYING AN ELLIPSOIDAL SOLID IMMERSION LENS

(76) Inventor: Michael J. Mandella, 10193 Parkwood Dr., #2, Cupertino, CA (US) 95014

( * ) Notice: Subject to any disclaimer, the term of this patent is extended or adjusted under 35 U.S.C. 154(b) by 32 days.

This patent is subject to a terminal disclaimer.

(21) Appl. No.: 09/698,993

(22) Filed: Oct. 27, 2000

Related U.S. Application Data

(63) Continuation-in-part of application No. 09/354,841, filed on Jul. 16, 1999, now Pat. No. 6,181,478.

(51) Int. Cl.[7] .......................... G02B 11/00; G02B 13/18; G02B 6/32
(52) U.S. Cl. ....................... 359/642; 359/708; 359/712; 385/33
(58) Field of Search ................................. 359/642, 708, 359/712, 656–661; 385/14–15, 31, 33–35, 39, 43

(56) References Cited

U.S. PATENT DOCUMENTS

| | | | | |
|---|---|---|---|---|
| 4,697,867 A | * | 10/1987 | Blanc et al. | 385/43 |
| 4,737,006 A | | 4/1988 | Warbrick | 385/33 |
| 4,770,514 A | | 9/1988 | Silverglate | 359/728 |
| 4,962,988 A | | 10/1990 | Swann | 385/34 |
| 5,293,438 A | * | 3/1994 | Konno et al. | 385/35 |
| 5,600,492 A | | 2/1997 | Tanaka et al. | 359/712 |
| 5,654,831 A | | 8/1997 | Byren et al. | 359/718 |
| 5,910,940 A | | 6/1999 | Guerra | 369/275.1 |
| 5,917,660 A | | 6/1999 | Ohtaki | 359/710 |
| 5,978,139 A | | 11/1999 | Hatakoshi et al. | 359/565 |
| 5,991,098 A | | 11/1999 | Pareto | 359/718 |
| 6,033,515 A | | 3/2000 | Walters et al. | 156/272.8 |
| 6,114,689 A | * | 9/2000 | Cho et al. | 250/216 |
| 6,181,478 B1 | * | 1/2001 | Mandella | 359/642 |
| 6,236,513 B1 | * | 5/2001 | Mallary | 359/642 |

OTHER PUBLICATIONS

Fletcher, D.A., et al., "Near Field Infrared Imaging with a Microfabricated Solid Immersion Lens", Applied Physics Letters, vol. 77, No. 14, Oct. 2, 2000, pp. 2109–2111.

* cited by examiner

*Primary Examiner*—Jordan M. Schwartz
(74) *Attorney, Agent, or Firm*—Lumen Intellectual Property Services, Inc.

(57) ABSTRACT

An ellipsoidal solid immersion lens (ESIL) for use as a collimator for a waveguide. The ESIL has a refractive index n, an ellipsoidal surface portion defining a geometrical ellipsoid with geometrical foci $F_1$, $F_2$ along a major axis of length M. The ESIL has an attachment surface portion for joining to the waveguide. The attachment surface portion passes near or through the second geometrical focus $F_2$. The geometrical foci $F_1$, $F_2$ are separated by a distance $S=M/n$, such that a collimated light beam propagating along the major axis M and entering the ESIL through the ellipsoidal surface portion converges to a focus substantially at the second geometrical focus $F_2$.

16 Claims, 3 Drawing Sheets

COLLIMATOR EMPLOYING AN ELLIPSOIDAL SOLID IMMERSION LENS

RELATED APPLICATIONS

This application is a continuation-in-part of U.S. patent application Ser. No. 09/354,841, filed Jul. 16, 1999, now U.S. Pat. No. 6,181,478, issued Jan. 30, 2001.

FIELD OF INVENTION

This invention generally relates to ellipsoidal solid immersion lenses and collimators using such ellipsoidal solid immersion lenses.

BACKGROUND OF THE INVENTION

In many optical systems and applications, such as near-field microscopy, imaging, photolithography and optical storage it is important to reduce the spot size and thus obtain higher definition or resolution. The spot size of an optical system, e.g., an optical storage system, is commonly defined as the distance between half power points. This distance is determined by diffraction to be approximately $\lambda/(2 \cdot NA)$, where $\lambda$ is the free space wavelength of the light used and NA is the numerical aperture of the objective lens focusing the light beam. NA is defined as $NA = n \sin(\theta)$, where $\theta$ is the half cone angle of the focused light rays and n is the index of refraction of the medium in which $\theta$ is measured.

One way to improve the definition is to work at shorter wavelengths $\lambda$, e.g., in the green or blue range, and to increase the numerical aperture to be as close to one as possible. A further possibility is to employ near-field optics in the manner described by Betzig et al. in *Applied Physics Letters*, Vol. 62, pp. 142 (1992), using a tapered fiber with a metal film with a small pinhole at the end. The definition of the system is determined by the size of the pinhole, and can be 50 nm or less. The advantages of the fiber probe system are its excellent definition and its polarization preserving capability which is particularly useful in magneto-optic storage applications. The disadvantages of the system are its poor light efficiency and the fact that it can only observe a single spot at a time, thus limiting its tracking ability when used for optical storage.

Another alternative is to use a solid immersion lens (SIL) between the objective lens and the illuminated object, e.g., an optical recording medium or sample under investigation. The SIL is placed within a wavelength $\lambda$ or less (in the near-field) of the object. Optical systems taking advantage of appropriate SILs are described, e.g., by S. M. Mansfield et al. "Solid Immersion Microscope", Applied Physics Letters, Vol. 57, pp. 2615–6 (1990); S. M. Mansfield et al. "High Numerical Aperture Lens System for Optical Storage", Optics Letters, Vol. 18, pp. 305–7 (1993) and in U.S. Pat. No. 5,004,307 issued to G. S. Kino et al. In this patent Kino et al. teach the use of a high refractive index SIL having a spherical surface facing the objective lens and a flat front surface facing an object to be examined. The use of this SIL enables one to go beyond the Rayleigh diffraction limit in air. In one embodiment, the SIL is employed in a near-field application in a reflection optical microscope to increase the resolution of the microscope by the factor of $1/n$, where n is the index of refraction of the SIL.

A paper by G. S. Kino presented at the SPIE Conference on Far- and Near-Field Optics, "Fields Associated with the Solid Immersion Lens", SPIE, Vol. 3467, pp. 128–37 (1998) describes in more detail the principles of operation of two particular SILs. The first is a hemispherical SIL and the second is a supersphere SIL or a stigmatic SIL. The hemispherical SIL improves the effective NA of the objective lens by the refractive index n of the SIL and decreases the spot size by $1/n$. The supersphere SIL increases the effective NA of the objective lens by the square of the refractive index $n^2$ and obtains a focus at a distance $a/n$ from the center of the supersphere, where a is the sphere's radius. The spot size is reduced by a factor of $n^2$. The performance characteristics and theoretical limitations of both types of SILs are also discussed.

SILs have found multiple applications. For example, Corle et al. in U.S. Pat. No. 5,125,750 teach the use of a SIL in an optical recording system to reduce the spot size in an optical recording medium. These SILs typically have a spherical surface facing the objective lens and a flat surface facing an optical recording medium. The flat surface is in close proximity to the medium.

In U.S. Pat. No. 5,497,359 Mamin et al. teach the use of a superhemisphere SIL in a radiation-transparent air bearing slider employed in an optical disk data storage system. Lee et al. in U.S. Pat. No. 5,729,393 also teach an optical storage system utilizing a flying head using a SIL with a raised central surface facing the medium. In U.S. Pat. No. 5,881,042 Knight teaches a flying head with a SIL partially mounted on a slider in an optical recording system. This slider incorporates the objective lens and it can be used in a magneto-optic storage system. Finally, in U.S. Pat. No. 5,883,872 Kino teaches the use of a SIL with a mask having a slit for further reducing the spot size and thus increasing the optical recording density in an optical storage system, e.g., a magneto-optic storage system.

The prior art SILs as well as the optical systems using them have a number of shortcomings. Hemispherical SILs suffer from back reflection problems. These degrade system performance, especially when the light source is a laser, e.g., a laser diode, and the back reflection is coupled back into the laser. Also, the ray reflected from the spherical surface and the ray reflected from the flat surface or from an object just below the flat surface are coincident. This gives rise to undesirable interference effects.

Superhemispherical SILs have reduced back reflection. However, they demagnify the image of the object by a larger factor than hemispherical SILs. For example, the demagnification of superhemispherical SILs in the axial direction is $1/n^3$. Because of this, the length tolerance for the superhemispherical SIL is very tight. Both the hemispherical and superhemispherical SILs increase the effective NA ($NA_{eff}$) of the objective lens (for hemispherical SIL $NA_{eff} = NA_{objective} \cdot n$; and for superhemispherical SIL $NA_{eff} = NA_{objective} \cdot n^2$). The maximum $NA_{eff}$ that can be obtained by either type of SIL is $NA_{eff} = n$.

Hemispherical, superhemispherical and related SILs experience alignment problems because optical systems employing them require the use of a separate objective lens. This separate lens has to be accurately aligned with the SIL. In many optical systems alignment between these two lenses can not be easily preserved due, to external influences (vibrations, stresses, thermal effects etc.). In addition, in systems where the number of parts is to be small, e.g., for weight and size reasons the objective lens is cumbersome.

In addition, there is a need in the industry to develop effective, light-weight and easy to use collimators for waveguides such as optical fibers. The fusing of lenses, e.g., graded index lenses (GRINs), to the ends of fibers is known and described, e.g., in U.S. Pat. No. 4,737,006 to Warbrick, U.S. Pat. No. 4,962,988 to Swann and U.S. Pat. No. 6,033, 515 to Walters et al. These patents also teach techniques for performing fusion splicing of a lens to the fiber. Additional fusion splicing techniques are described, e.g., in U.S. Pat. No. 5,299,274 to Wysocki et al. and U.S. Pat. No. 5,745,311 to Fukuoka et al. These and other prior art fusion spliced parts and splicers attempt to overcome alignment problems encountered in these techniques.

Unfortunately, prior art SILs require additional objective lenses, as mentioned above, and require precise alignment with those. Hence proper splicing with a waveguide, e.g., a fiber, is only one of the problems. It would be an advance in the art if SILs which are less tolerant to alignment problems could be developed for fusion splicing with waveguides.

OBJECTS AND ADVANTAGES

Accordingly, it is a primary object of the present invention to provide a solid immersion lens (SIL) which overcomes the prior art limitations and ensures a small spot size. It is a specific object of the invention to integrate the objective lens and the solid immersion lens into a single collimator.

It is a further object of the invention to provide such an integrated SIL for fusion splicing applications with waveguides such as optical fibers.

Further objects and advantages will become apparent upon reading the detailed description.

SUMMARY

The objects and advantages of the invention are secured by a collimator integrated with a waveguide and employing an ellipsoidal solid immersion lens (ESIL). The ESIL has a substantially uniform index of refraction n, an ellipsoidal surface portion defining a geometrical ellipsoid with a major axis M, a first geometrical focus $F_1$ and a second geometrical focus $F_2$ separated from first geometrical focus $F_1$ by a separation $S=M/n$. The collimator has an attachment surface portion passing substantially through second geometrical focus $F_2$. The attachment surface portion is for attaching the ESIL to the waveguide such that a collimated light beam propagating along major axis M through the ellipsoidal surface portion converges to a focus substantially at second geometrical focus $F_2$ or at the waveguide.

The attachment of the attachment surface to the waveguide can be performed in many ways. The manner in which the waveguide and ESIL are joined can be adapted to the type of waveguide, e.g., an optical fiber or a buried waveguide. In one embodiment the attachment surface is attached to the waveguide by a fused butt joint.

In one convenient embodiment of the invention the ESIL has a body and a pedestal. The body has the ellipsoidal surface portion through which light passes. The pedestal has the attachment surface portion by which the ESIL is attached to the waveguide. The pedestal can have a pedestal cross section dimensioned to match the waveguide. For example, when the waveguide is an optical fiber the pedestal cross section can equal that of the optical fiber. The pedestal cross section can also be tapered, e.g., it can be tapered down from a larger cross section to the cross section of the waveguide at the attachment surface portion. In another embodiment the ESIL has a cross section matched to the waveguide.

The ESIL can be made of one or more sections, depending on the application of the collimator and design requirements. However, it is preferable that the attachment surface portion be flat for easier attachment, e.g., by fusion bonding to the wave guide.

The details of the invention are explained in the detailed description in reference to the attached drawing figures.

DETAILED DESCRIPTION

Figure 1:
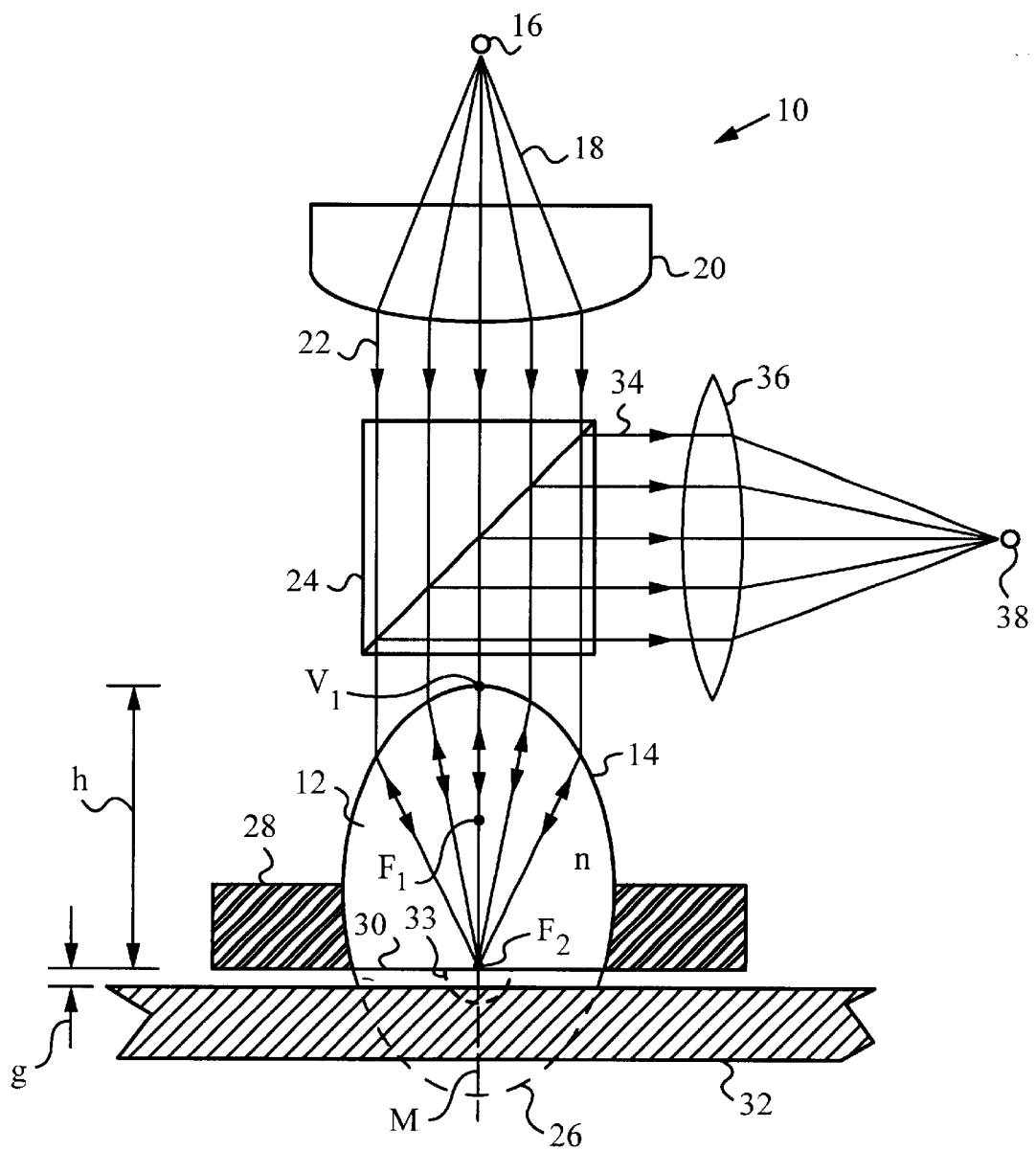
FIG. 1 is a cross sectional side view of an optical system employing an ESIL according to the invention.

FIG. 1 illustrates in a cross-sectional side view a general optical system 10 employing an elliptical solid immersion lens (ESIL) 12 with an ellipsoidal surface portion 14. System 10 has a light source 16 which delivers a diverging light beam 18. A collimating lens 20 is placed in the path of beam 18 to form a collimated light beam 22.

Collimated beam 22 passes through a beam splitter 24 and is incident on the ellipsoidal surface portion 14 of ESIL 12. ESIL 12 is made of a suitable refractive material, e.g., glass or plastic, having a substantially uniform index of refraction n. ESIL 12 is mounted in a support plate 28. Plate 28 can be made of the same material as ESIL 12 or a different material.

In fact, ellipsoidal surface portion 14 defines an entire geometrical ellipsoid 26. The remaining portion of geometrical ellipsoid 26 beyond actual ESIL 12 is drawn in dashed lines. Ellipsoid 26 has a major axis M as well as a first geometrical focus $F_1$ and a second geometrical focus $F_2$. Both geometrical foci $F_1$, $F_2$ lie on major axis M.

ESIL 12 has a flat interface surface 30 which passes through second geometrical focus $F_2$ of ellipsoid 26 such that geometrical focus $F_2$ itself is contained inside ESIL 12. Interface surface 30 should be as close as possible to $F_2$ for best performance. A height h of ESIL 12 is thus defined between interface surface 30 or geometrical focus $F_2$ and a vertex $V_1$, at the top of ellipsoidal surface portion 14.

Interface surface 30 of ESIL 12 is positioned a distance g above an object 32. Distance g is set at less than a wavelength $\lambda$ of light making up beam 22. In other words, object 32 is placed in the near-field region of ESIL 12.

In this embodiment, object 32 is a sample to be examined optically in region 33 of interest. Optical system 10 is a microscope set up to receive a light beam 34 back-scattered or reflected by object 32 upon illumination with beam 22. Back-scattered or reflected beam 34 passes back through ESIL 12 and is deflected by beam splitter 24 and focused by a lens 36 to a detector 38. Advantageously, system 10 employs the principles of confocal microscopy well-known in the art.

Figure 2:
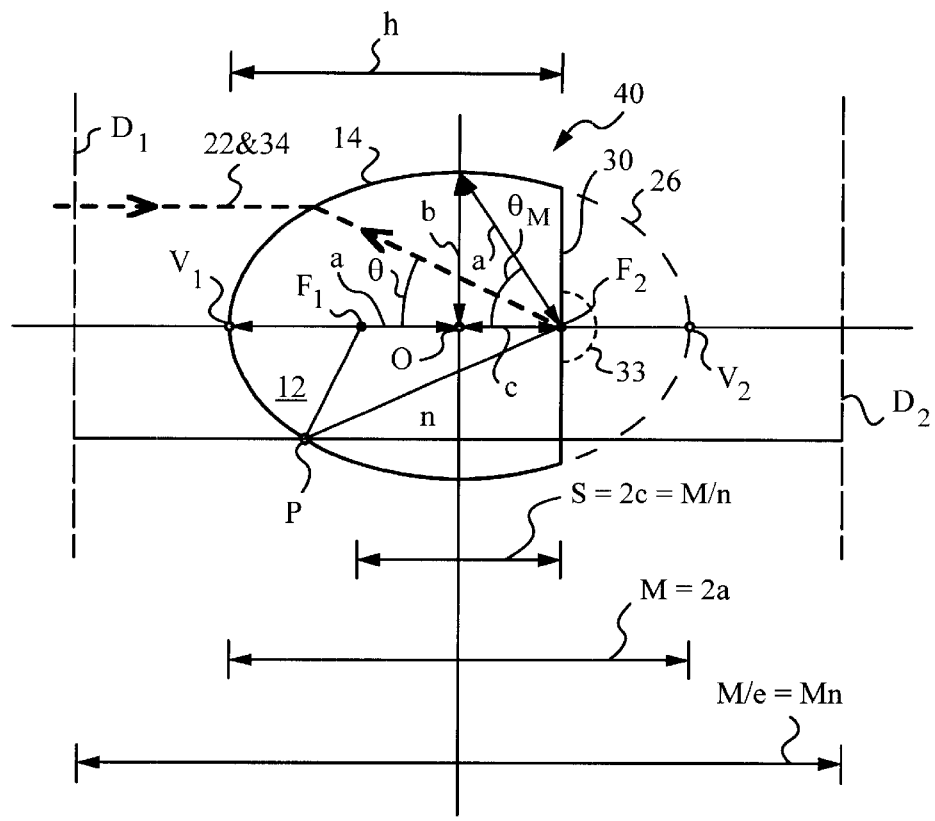
FIG. 2 is a detailed schematic view of the ESIL of FIG. 1.

The operation of ESIL 12 will be better understood by examining FIG. 2 in which geometrical ellipsoid 26 is shown in cross section along major axis M. The cross section of ellipsoid 26 is an ellipse 40; ellipsoid 26 is generated by revolving ellipse 40 around major axis M. Ellipse 40 is defined in accordance with standard geometrical conventions. In particular, ellipse 40 is defined with the aid of a first directrix $D_1$ and a second directrix $D_2$ as follows:

$$\overline{PF}_1 = e\overline{PD}_1 \text{ and } \overline{PF}_2 = e\overline{PD}_2$$

where $\overline{PF}_1, \overline{PD}_1, \overline{PF}_2$ and $\overline{PD}_2$ represent the distances shown in FIG. 2 between point P and focus $F_1$, directrix $D_1$, focus $F_2$ and directrix $D_2$, respectively, and where e is the eccentricity of ellipse 40. Eccentricity e is defined as:

$$e \equiv \frac{c}{a} = \frac{\sqrt{a^2 - b^2}}{a}.$$

The distance from the center 0 of ellipse 40 to either focus $F_1$, $F_2$ is c and a separation S between foci $F_1$, $F_2$ is thus equal to 2c (S=2c). The length of major axis M is equal to 2a and the distance between directrices $D_1$, $D_2$ is equal to M/e.

In accordance with the invention, refractive index n of ESIL 12 is selected such that separation S between foci $F_1$, $F_2$ is equal to the length of major axis M divided by refractive index n, in other words S=2c=M/n. Under this condition collimated light beam 22 propagating parallel to major axis M and entering ESIL 12 through ellipsoidal surface portion 14 is focused at second geometrical focus $F_2$. Also, light 34 back-scattered at geometrical focus $F_2$ returns through SIL 12 along the path traversed by beam 22. In fact, light 34 back-scattered in near-field region 33 of geometrical focus $F_2$ returns substantially along the same path as beam 22 and is used for imaging object 32. Both evanescent and plane waves can be involved in the back-scattering process. For a theoretical description of the fields in the near-field region of a SIL see G. S. Kino, SPIE Conference on Far- and Near-Field Optics, "Fields Associated with the Solid Immersion Lens", SPIE, Vol. 3467, pp. 128–37 (1998).

It will be appreciated by a person skilled in the art that present design of ESIL 12 integrates the function of objective lens and the SIL as used in prior art systems. In other words, ESIL 12 is actually an integrated objective and SIL lens. The effective NA, $NA_{eff}$, and the maximum effective NA, max. $NA_{eff}$, can both be expressed in terms of index n of ESIL 12 as follows:

$NA_{eff} = n\sin\theta$ max. $NA_{eff} = n\sin\theta_M = \sqrt{n^2 - 1}$

The design parameters of ESIL 12 are advantageously expressed in terms of refractive index n. Table 1 gives the design parameters for several particular choices of index n of ESIL 12. The design parameters are expressed in terms of n as well as in terms of lengths a, b and eccentricity e.

TABLE 1

| n | $\sqrt{n^2-1}$ max. $NA_{eff}$ | $\sqrt{n^2-1}/n$ b/a | 1/n e | $\lambda/2 \cdot NA_{eff}$ spot size at $\lambda$ = 400 nm |
|---|---|---|---|---|
| 1.5 | 1.118 | .745 | .667 | 170 nm |
| 2.0 | 1.732 | .866 | .500 | 115 nm |
| 2.5 | 2.291 | .917 | .400 | 87 nm |
| 3.0 | 2.828 | .943 | .333 | 70 nm |
| 3.5 | 3.354 | .958 | .286 | 59 nm |

Although in the above embodiment ESIL 12 is used in microscope 10 it can be implemented in any other optical system requiring small spot size, high resolution and mechanical stability obtained by virtue of eliminating the objective lens. Specifically, ESIL 12 can be used as a collimator for waveguides such as optical fibers or buried waveguides.

Figure 3A:
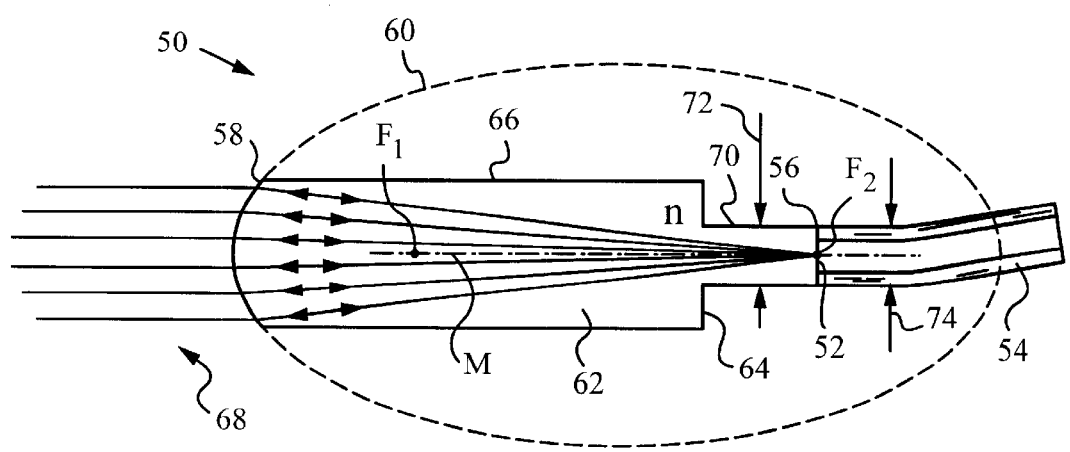
FIG. 3A–D are cross sectional side views illustrating various collimators employing ESILs according to the invention.

FIG. 3A illustrates an ESIL 50 according to the invention with an attachment surface portion 52, which is also the interface surface portion passing through or very near second geometrical focus $F_2$ of ESIL 50. ESIL 50 has an ellipsoidal surface portion 58, which is smaller than in the previous embodiment, and defines a geometrical ellipsoid 60. As before, ellipsoid 60 has a major axis M along which lie the two foci $F_1$, $F_2$ at the separation governed by S=M/n.

In this embodiment ESIL 50 is a collimator integrated with a waveguide 54, in this case an optical fiber, by a fused butt joint 56 at attachment surface portion 52. ESIL 50 has a body 62 which terminates at ellipsoidal surface portion 58. Body 62 has a side wall 66 and a flat bottom 64 opposite ellipsoidal surface portion 58. It will be appreciated by a person skilled in the art that the exact shape of side wall 66 and bottom 64 are a matter of the designer's choice as long as a collimated light beam 68 propagating along major axis M through ellipsoidal surface portion 58 converges to an optical focus at second geometrical focus $F_2$. In other words, the design of body 62 should not interfere with the propagation of light 68 through body 62.

A cylindrical protrusion or pedestal 70 extends from bottom 64 of body 62. It is important that the region between body 62 and pedestal 70 preserve a uniform refractive index n. To ensure this body 62 and pedestal 70 can be molded as one part out of moldable glass or plastic or produced at the same time by a photolithographic technique. For further information on photolithographic and other fabrication techniques which can be used in the manufacture of ESIL 50, e.g., Optics&Photonics News, September 1999, pp. 19–22.

Pedestal 70 has a cross section 72 which matches a cross section 74 of optical fiber 54. This matching of cross sections enables better splicing and alignment of ESIL 50 with optical fiber 54. Proper alignment should position the center of the core of optical fiber 54 as close as possible to second geometrical focus $F_2$. Optical fiber 54 can be a single mode or multimode fiber. In this manner efficient in-coupling of collimated light 68 into fiber 54 as well as collimation of light exiting fiber 54 is achieved. The method of fusing fiber 54 to attachment surface portion 52 to obtain good alignment and reliable joint 56 is known in the art. Further information on this technique can be found in the patent references listed in the background section of this patent such as U.S. Pat. Nos. 4,962,988; 5,299,274. It should be noted that it is possible that attachment surface portion 52 for splicing the ESIL 50 to waveguide 54 exhibit a mechanical feature, e.g., a protrusion or circumferential ridge to further improve alignment. However, when using existing fusion splicing techniques it is preferable that the attachment surface portion be substantially flat.

Since cross section 72 of pedestal 70 is matched to cross section 74 of optical fiber 54, existing fiber optic fusion splicing methods using electric arc or laser heat sources can be used. For example, in some techniques for fusion splicing of single mode fibers, first the alignment is done by video camera keeping a small gap between the fibers during heating by an electric arc, then the gap is closed once the glass at the ends is heated just below the melting temperature. This method, as well as other methods may not require a gap to accomplish uniform heating depending on the type of heat source used and how the heat is supplied.

In a particular embodiment of ESIL 50 the material is fused silica with a refractive index of n=1.46 at a wavelength of 550 nm to match the fused silica of fiber 54 which has a refractive index of n=1.46 at 550 nm as well. The total thickness of ESIL 50 is 2.5 mm. Pedestal 70 is 0.5 mm long and has a diameter of 125 microns while body 62 has a diameter of 500 microns and is 2.0 mm long. The ellipsoidal eccentricity e=1/n=0.6849; Major axis M=2.968 mm; separation between foci S=2.033 mm and the numerical aperture of ESIL 50 $NA_{lens}=n\sin\theta=0.146$. The last exceeds the numerical aperture of fiber 54 which is $NA_{fiber}=0.13$. The beam diameter of collimated light 68 is 0.446 mm. It will be appreciated that these values are merely exemplary of one particular design of ESIL 50. For example, infrared wavelengths are used in telecommunications systems and require single mode optical fibers having a typical core 8 microns diameter and a cladding of 125 microns diameter. Here, ESIL 50 collimator design will be determined mainly by the desired diameter of collimated beam of light 68 and index of refraction n of the material of ESIL 50 at the particular wavelength of operation.

Figure 3B:
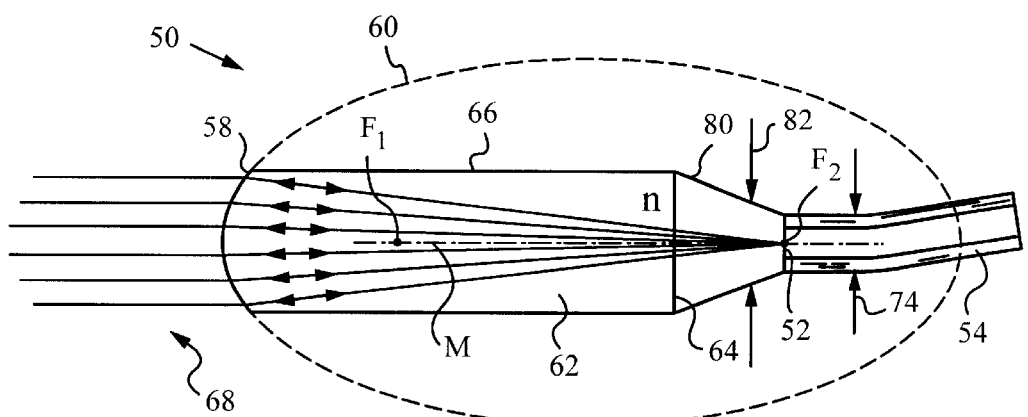

FIG. 3B illustrates another embodiment of ESIL 50 collimator in which like reference numbers are used to designate corresponding parts from FIG. 3A. In contrast to the embodiment of FIG. 3A, ESIL 50 has a tapered pedestal 80. In particular, a cross section 82 of pedestal 80 is matched to the cross section of body 62 at bottom 64. The taper decreases from this larger cross section at bottom 64 to cross section 74 of fiber 54 at attachment surface portion 52. In this embodiment ESIL 50 can also be fabricated as one part or it can be made of two parts or sections, e.g., body 62 and tapered pedestal 80 separately. The taper of pedestal 80 enables good alignment and ensures reliable bonding with body 62. In fact, pedestal 80 could first be spliced with fiber 54 and then spliced with body 62.

Figure 3C:
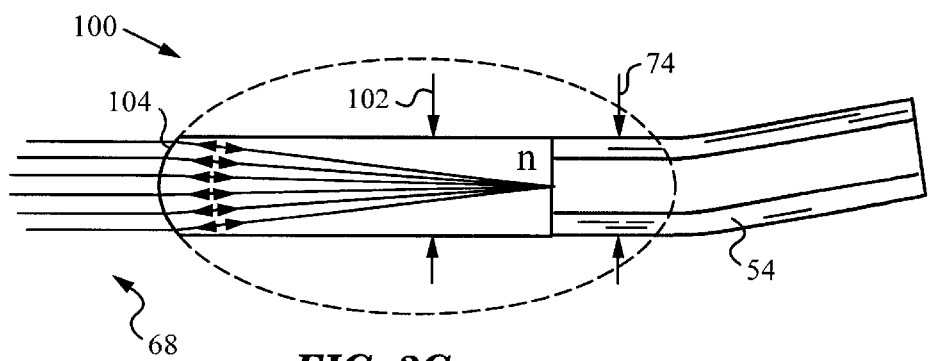

FIG. 3C illustrates an ESIL 100 collimator which is made of one section. ESIL 100 has an ellipsoidal surface portion 104 and cross section 102 matched to cross section 74 of fiber 54. This permits splicing ESIL 100 directly to fiber 54 without the use of pedestals. In this embodiment the reduced cross section of ESIL 100 at ellipsoidal surface portion 104 will reduce the collimated beam diameter of light 68.

Figure 3D:
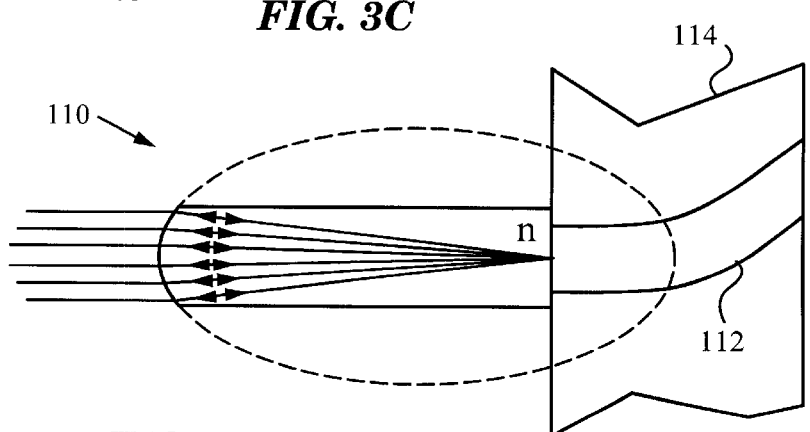

FIG. 3D illustrates an ESIL 110 collimator attached to a waveguide 112 buried in a structure 114. In this case, where the cross section of ESIL 110 is substantially smaller than the cross section of structure 114 then attachment can be accomplished by a laser fusion splice method as disclosed in U.S. Pat. No. 6,033,515, or by adhesives or other methods.

The above embodiments are presented to illustrate the present invention and are not to be construed as limitations thereof. Accordingly, the scope of the invention should be determined by the following claims and their legal equivalents:

What is claimed is:

1. A collimator integrated with a waveguide, said collimator comprising:
   a) an ellipsoidal solid immersion lens having a substantially uniform index of refraction n, an ellipsoidal surface portion defining a geometrical ellipsoid having a major axis of length M, a first geometrical focus $F_1$, a second geometrical focus $F_2$ separated from said first geometrical focus $F_1$ by a separation $S=M/n$;
   b) an attachment surface portion passing substantially through said second geometrical focus $F_2$ for attaching said ellipsoidal solid immersion lens to said waveguide such that a collimated light beam propagating along said major axis M through said ellipsoidal surface portion converges to a focus substantially at said second geometrical focus $F_2$.

2. The collimator of claim 1, wherein said attachment surface is attached to said waveguide by a fused butt joint.

3. The collimator of claim 1, wherein said waveguide is selected from the group consisting of optical fibers and buried waveguides.

4. The collimator of claim 1, wherein said ellipsoidal solid immersion lens comprises a body comprising said ellipsoidal surface portion and a pedestal comprising said attachment surface portion.

5. The collimator of claim 4, wherein said pedestal has a pedestal cross section matched to said waveguide.

6. The collimator of claim 5, wherein said waveguide is an optical fiber.

7. The collimator of claim 4, wherein said pedestal has a tapered pedestal cross section.

8. The collimator of claim 1, wherein said ellipsoidal solid immersion lens has a cross section matched to said waveguide.

9. The collimator of claim 8, wherein said waveguide is an optical fiber.

10. The collimator of claim 1, wherein said ellipsoidal solid immersion lens comprises at least two sections.

11. The collimator of claim 1, wherein said attachment surface portion is substantially flat.

12. The collimator of claim 1, wherein said waveguide is a single mode optical fiber.

13. The collimator of claim 12, wherein said ellipsoidal solid immersion lens is made of fused silica.

14. The collimator of claim 12, wherein said ellipsoidal solid immersion lens is made of moldable glass.

15. The collimator of claim 1, wherein said attachment surface portion is attached to said waveguide by an adhesive.

16. The collimator of claim 1, wherein said attachment surface portion is attached to said waveguide by a laser fusion-splice method.

* * * * *